United States Patent
Shoji et al.

(10) Patent No.: US 6,545,825 B2
(45) Date of Patent: Apr. 8, 2003

(54) LENS HOLDING FRAME FOR SECURING LENS ELEMENT TO LENS BASE

(75) Inventors: Masao Shoji, Saitama (JP); Tetsuya Okumura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/120,525

(22) Filed: Apr. 12, 2002

(65) Prior Publication Data

US 2002/0154419 A1 Oct. 24, 2002

(30) Foreign Application Priority Data

Apr. 20, 2001 (JP) ........................................ 2001-121942

(51) Int. Cl.[7] ................................................ G02B 7/02
(52) U.S. Cl. ...................................................... 359/819
(58) Field of Search ................................. 359/808, 819

(56) References Cited

U.S. PATENT DOCUMENTS 5,117,311 A * 5/1992 Nomura ....................... 359/819
6,091,554 A * 7/2000 Sharp et al. ................. 359/819
2002/0090220 A1 * 7/2002 Mikami ....................... 396/508
2002/0126401 A1 * 9/2002 Sasaki ......................... 359/823

FOREIGN PATENT DOCUMENTS

JP        A 11-174303        7/1999

* cited by examiner

*Primary Examiner*—Ricky Mack
(74) *Attorney, Agent, or Firm*—Young & Thompson

(57) ABSTRACT

A taking lens of a camera includes first and second lens elements. A lens holding frame retains the first lens element on a lens base or a front surface of a shutter unit. In the lens holding frame, a holding frame body is disposed in front of the first lens element. Arm portions are formed to project from a periphery of the holding frame body, have a distance to the lens base when in a free state, are bent resiliently by a retention pin or screws, and are secured to the lens base. Thus, the first lens element is squeezed tightly between the lens base and the holding frame body.

10 Claims, 4 Drawing Sheets

LENS HOLDING FRAME FOR SECURING LENS ELEMENT TO LENS BASE

BACKGROUND OF THE INVENTION

1. Field of the Invention

The present invention relates to a lens holding frame for securing a lens element to a lens base. More particularly, the present invention relates to a lens holding frame for securing a lens element to a lens base in an optical instrument with sufficient tightness easily and exactly.

2. Description Related to the Prior Art

A camera among various types of optical instruments includes a taking lens. To focus an image sharply, the lens must be properly controlled for a position. In the course of manufacturing the camera, it is necessary to position the taking lens in two manners, namely, in a direction along an optical axis of the taking lens, and also in directions vertical to the optical axis. It is known in the art to assemble the taking lens in a shutter unit which accommodates a shutter blade and a mechanism for driving the shutter blade. This is effective in miniaturizing the body of the camera.

In FIG. 4, a shutter unit 61 of a known type is illustrated. A shutter blade is incorporated in the shutter unit 61. An electromagnet in the shutter unit 61 controls operation of opening and shutting the shutter blade. A lens holding chamber 62 is formed in a front wall of the shutter unit 61 in a recessed shape for lens assembling. A lens holding frame 64 is inserted in the lens holding chamber 62. A lens element 63 of a taking lens is retained in the lens element 63. A projection end 64a of the lens holding frame 64 is provided. A reference plane 65 is formed with the shutter unit 61, and is contacted by the projection end 64a, so as to position the lens element 63 in the optical axis direction. Bosses 66 are formed to project from the shutter unit 61. A plate spring 67 is secured to the bosses 66 with screws. Push portions 68 of the plate spring 67 press the lens holding frame 64 toward the reference plane 65. An inner diameter of the lens holding chamber 62 of the shutter unit 61 is greater than an outer diameter of the lens holding frame 64. According to a difference between the diameters, the lens holding frame 64 is shifted in directions vertical to the optical axis, so as to reduce or remove eccentricity of the lens element 63 being positioned. After removing the eccentricity, adhesive agent is applied to suitable portions to fasten the lens holding frame 64 to the shutter unit 61.

However, the above-described known method has a problem. To set the lens holding frame 64 on the reference plane 65 of the shutter unit 61, the plate spring 67 is required. To fasten the plate spring 67 to the shutter unit 61 as a holder for the taking lens, the bosses 66 must be formed to protrude. Therefore, the total number of parts is relatively high and cannot be low for the size reduction. A space for securing the mechanism cannot be reduced.

SUMMARY OF THE INVENTION

In view of the foregoing problems, an object of the present invention is to provide a lens holding frame for securing a lens element to a lens base easily, exactly and tightly, and also in a manner allowing easy adjustment of the position of the lens element.

In order to achieve the above and other objects and advantages of this invention, a lens holding frame for securing at least one lens element to a lens base is provided. A holding frame body sandwiches the lens element in cooperation with the lens base. At least two arm portions are formed integrally with the holding frame body, having resiliency, for extending substantially radially from the holding frame body. A retention member retains the arm portions to the lens base, the retention member being secured to the holding frame body with the arm portions kept resiliently deformed toward the lens base.

The holding frame body includes a plate portion disposed over one surface of the lens element. A lens opening is formed in a middle of the plate portion, for passage of light through the lens element. A barrel portion is disposed about a periphery of the lens element.

The arm portions have respectively arm holes, and the retention member is screws inserted through the arm holes, and helically fastened on the lens base.

The holding frame body further includes a flange formed on a periphery of the barrel portion, having the arm portions protruded therefrom. Plural arc-shaped slits are formed between the barrel portion and the flange, positioned to correspond to the arm portions, for facilitating deformation of the arm portions with resiliency.

The lens base is constituted by a plate of a shutter unit, and a recess is formed in the plate, for receiving entry of a portion of the lens element.

Bosses are formed on the lens base, for being inserted in the arm holes, and screw holes are formed in a middle of the bosses for helical engagement of the screws.

The arm holes have a diameter greater than a diameter of the boss for adjustment of a position of the holding frame body relative to the lens base.

The arm portions are attached to the lens base with adhesive agent after the screws are fastened on the bosses.

The plate portion includes a projection, disposed in a circular shape, for contacting the surface of the lens element, to push the lens element to the lens base.

Furthermore, a projection is formed to project from the flange substantially radially. An engagement hole is formed in the projection. A detent is formed with the lens base, for engagement with the engagement hole. At least one positioning pin is disposed to project from the lens base. A positioning arm portion is disposed to project from the flange. At least one positioning hole is formed in the positioning arm portion, for being fitted on the positioning pin.

In a preferred embodiment, the lens base is disposed behind the lens element, and the holding frame body is disposed in front of the lens element.

The screws include a threaded portion for helical engagement with a receiving hole formed in the lens base. A head portion is formed on a front end of the threaded portion with a greater head diameter that is greater than a diameter of the arm hole, for pushing the arm portion toward the lens base in the helical engagement of the threaded portion.

The positioning arm portion projects opposite to the projection of the flange with reference to the optical axis of the lens element.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
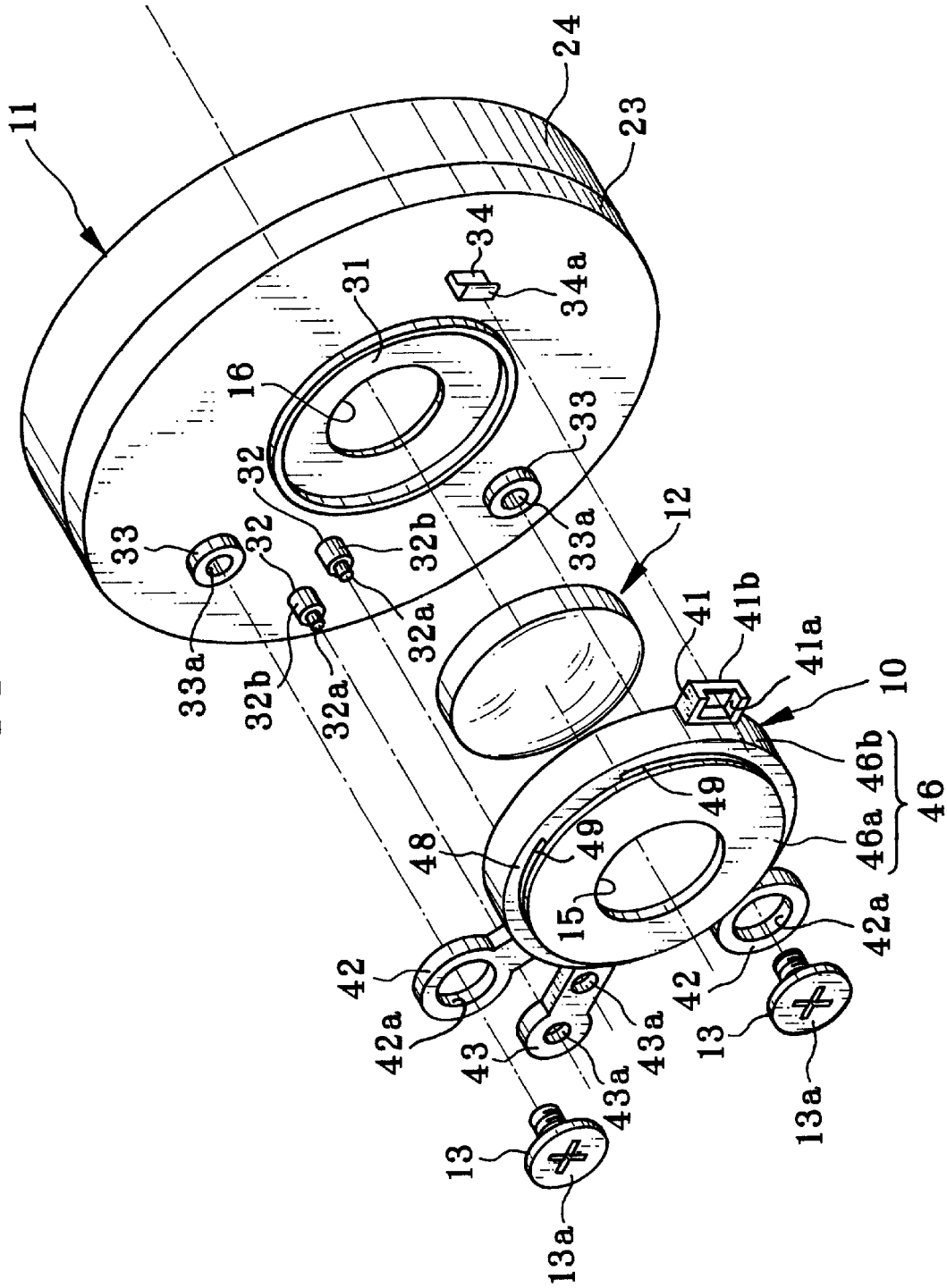
FIG. 1 is an exploded perspective illustrating a lens element, a lens base and a lens holding frame of the invention.
Figure 2A:
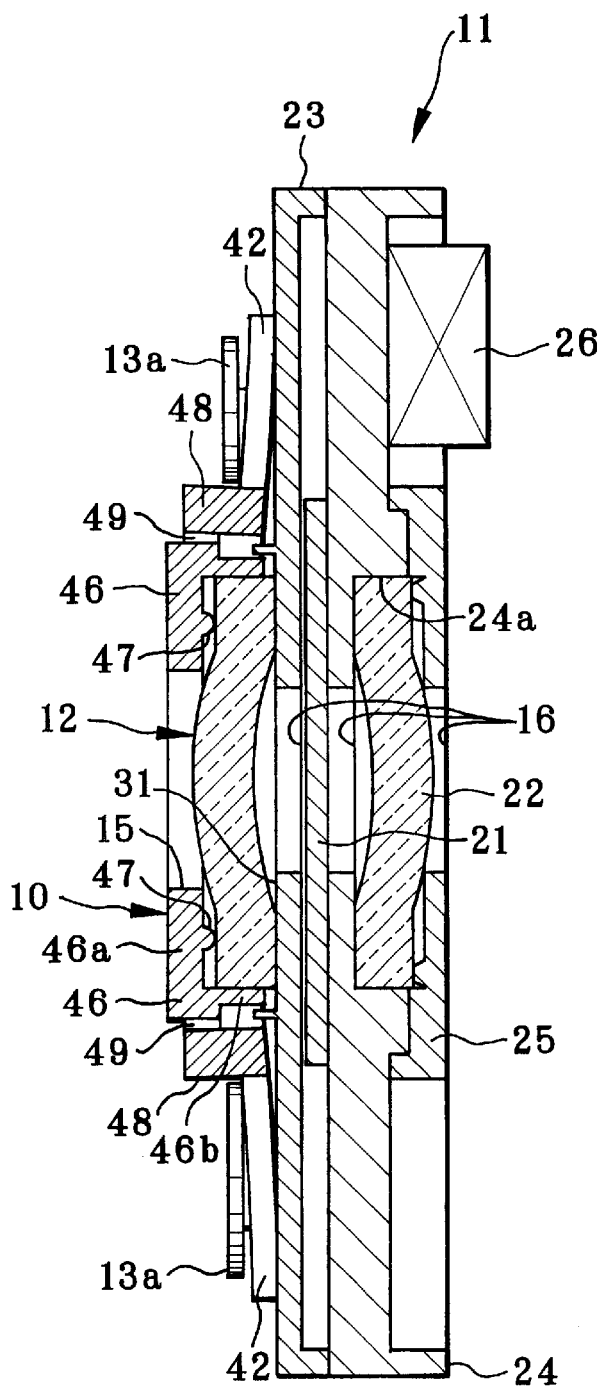
FIG. 2A is a cross section illustrating the same as FIG. 1.

In FIGS. 1 and 2A, a lens holding frame 10 of a lens holder of the invention is illustrated. A first lens element 12 is supported on a shutter incorporated lens base 11 or a plate of a shutter unit. The lens holding frame 10 retains the first lens element 12 on the lens base 11. A lens barrel (not shown) is incorporated in a camera in a manner extendable in an optical axis direction. The lens holding frame 10 is fixedly mounted in the lens barrel. Movement of the lens barrel is for purposes of zooming and focusing. The lens barrel is so moved as to set a taking lens in stepwise positions with preset focal lengths, and to set the taking lens in focus. Note that the lens holding frame 10 of the invention constitutes a variator lens group among plural lens groups (not shown) as a zoom lens system. However, the lens holding frame 10 may constitute a focusing lens group among plural lens groups (not shown) as taking lens system. Furthermore, it is possible to mount the lens holding frame 10 directly on a front face of a camera body without mounting in the lens barrel.

In FIG. 1, two retention screws 13 as retention pins fasten the lens holding frame 10 to the lens base 11. The lens holding frame 10 and the lens base 11 are parts generally formed from resin. A lens opening 15 is formed in the center of the lens holding frame 10. An exposure opening 16 is formed in the center of the lens base 11. The first lens element 12 is retained between the lens holding frame 10 and the lens base 11.

In FIG. 2A, the lens base 11 includes a shutter blade 21, a second lens element 22, a front shutter cover 23, a rear shutter cover 24, a support plate 25 and a solenoid 26. The front and rear shutter covers 23 and 24 cover the front and rear of the shutter blade 21. The support plate 25 supports a rear of the second lens element 22. The solenoid 26 drives the shutter blade 21. The shutter blade 21 is disposed on a front face of the rear shutter cover 24 in a rotatable manner. A lens holding chamber 24a is formed in a rear wall of the rear shutter cover 24, and holds the second lens element 22 between it and the support plate 25. Screws (not shown) are used to secure the front shutter cover 23 to the rear shutter cover 24, and the rear shutter cover 24 to the support plate 25 firmly.

The solenoid 26 is fixedly secured to the rear surface of the rear shutter cover 24. A winding (not shown) is supplied with current, for the solenoid 26 to shift a plunger (not shown) of iron. A shutter lever (not shown) is supported on the rear surface of the rear shutter cover 24 in a rotatable manner. The shutter lever has one end portion for contacting one end portion of the plunger so as to rotate upon driving of the plunger. A slit (not shown) is formed in the rear shutter cover 24. A projection (not shown) projects from a second end of the shutter lever, extends through the slit, and is engaged with the shutter blade 21. When the shutter lever swings, the shutter blade 21 is rotated. Accordingly, the solenoid 26 is turned on and off to cause the shutter lever to move the shutter blade 21. So, the exposure opening 16 is opened and shut. Note that a spring biases the shutter blade 21 toward a shut position for shutting the exposure opening 16.

When a shutter release button is depressed, the winding is supplied with electric current, to shift the plunger to rotate the shutter lever. The shutter blade 21 responsively shifts from the shut position to an open position, to open the exposure opening 16. When a predetermined time elapses, the current to the winding is discontinued. Thus, the shutter blade 21 is shifted by the spring from the open position to the shut position, to shut the exposure opening 16. Object light from the lens opening 15 and the exposure opening 16 is introduced to expose the photo film of the camera.

In FIG. 1, a receiving surface 31 is included in the front shutter cover 23 and contacts the first lens element 12. Also, positioning projections 32, bosses 33 for helical coupling, and a detent or hook-shaped retention pin 34 are formed to project from the front shutter cover 23 near to the receiving surface 31. Each of the positioning projections 32 includes a small-diameter pin 32a and a great-diameter rod 32b. The bosses 33 have a cylindrical shape. A screw hole 33a is formed in the center of the bosses 33 for helical coupling with the retention screws 13. An detent portion 34a projects from an end of the detent 34, and engageable with the lens holding frame 10.

The periphery of the lens holding frame 10 is provided with a projection portion or arm portion 41, two arm portions 42 and an positioning arm portion 43. The projection portion 41 has an engagement hole 41a and an edge segment 41b. The detent portion 34a is inserted the engagement hole 41a and engaged with the edge segment 41b. Thus, the lens holding frame 10 is coupled with the lens base 11. It is to be noted that the engagement hole 41a and the edge segment 41b have a greater width than that of the detent 34.

An end of the arm portions 42 has a circular shape. An arm hole 42a is formed in the center of the arm portions 42. A diameter of the arm hole 42a is greater than that of the bosses 33 but smaller than that of a head portion 13a of the retention screws 13. Each of the bosses 33 is insertable in the arm hole 42a.

Two positioning holes 43a are formed in the positioning arm portion 43 for receiving insertion of the small-diameter pin 32a of the positioning projections 32. A diameter of the positioning holes 43a is greater than that of the small-diameter pin 32a of the positioning projections 32 but smaller than that of the great-diameter rod 32b. A rear surface of the positioning arm portion 43 contacts a front surface of the great-diameter rod 32b.

Figure 3:
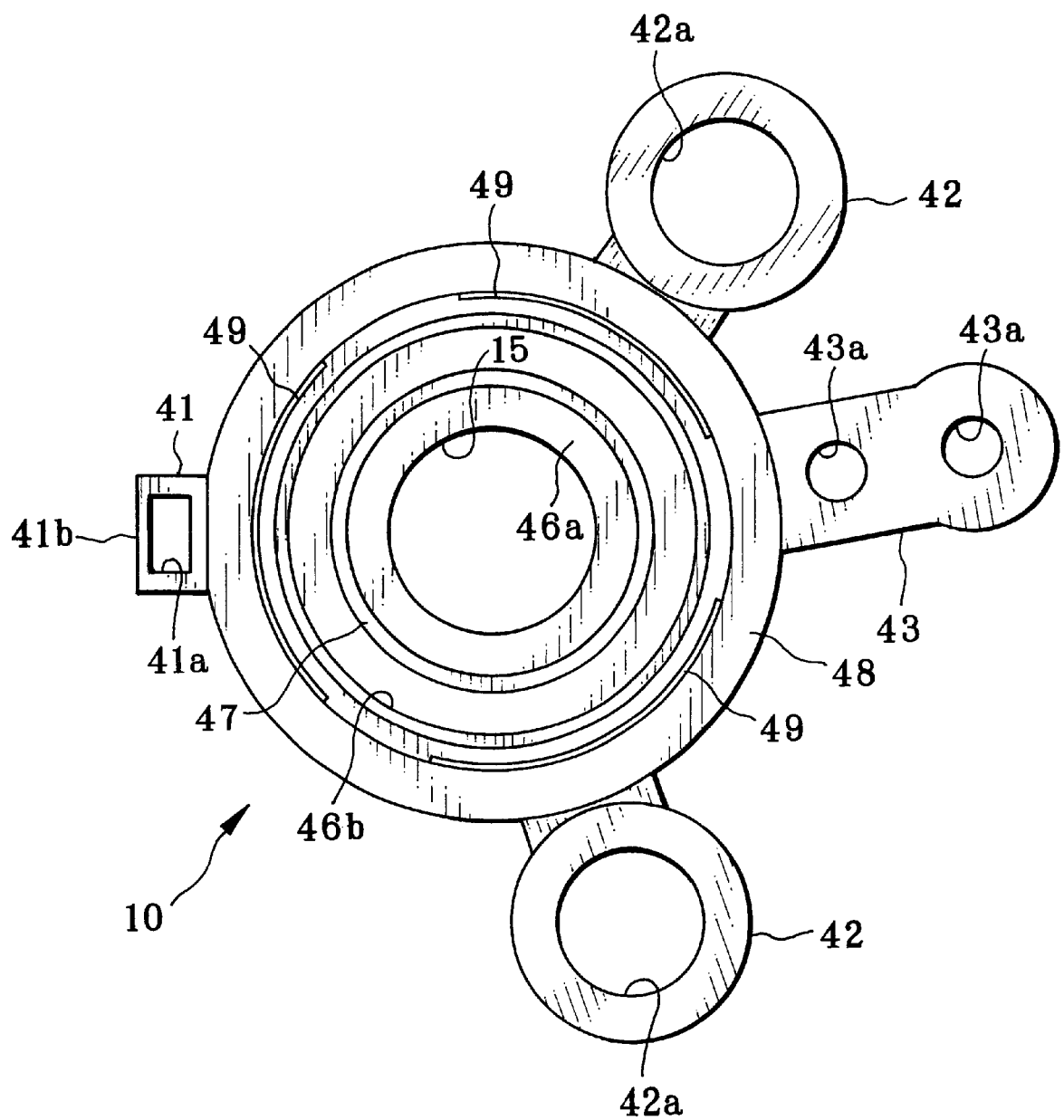
FIG. 3 is a rear elevation illustrating the lens holding frame.
Figure 4:
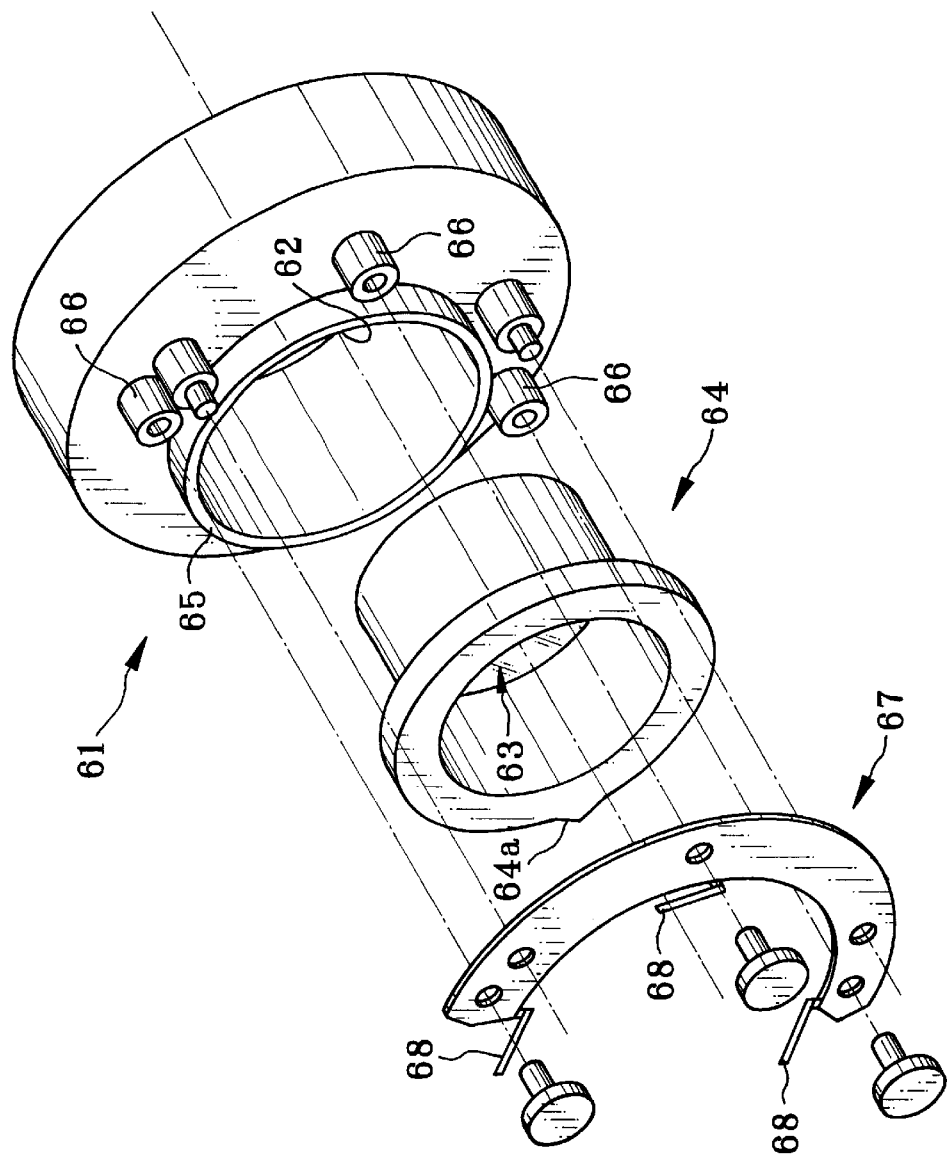
FIG. 4 is an exploded perspective illustrating a taking lens, a lens base and a lens holding frame according to the prior art.

In FIG. 3, the rear of the lens holding frame 10 is illustrated. A holding frame body 46 on the rear of the lens holding frame 10 has a barrel portion 46b and a ring-shaped plate portion 46a. The barrel portion extends to cover the periphery of the first lens element 12. The ring-shaped plate portion 46a contacts the first lens element 12. An inner diameter of the barrel portion 46b is substantially equal to an outer diameter of the first lens element 12. A positioning ridge portion 47 of a ring shape projects rearwards from the plate portion of the holding frame body 46 in the optical axis direction, and positions the first lens element 12 to extend in parallel with a direction of the lens holding frame 10.

A flange or rim 48 is formed to project from the periphery of the barrel portion 46b, and included in one piece of the holding frame body 46. The projection portion 41, the arm portions 42 and the positioning arm portion 43 radially protrude from the flange 48. Arc-shaped slits 49 are formed between the barrel portion 46b and the flange 48 in respectively an arc shape. In FIG. 2A, the lens holding frame 10 is coupled with the lens base 11 in a state with the first lens element 12 kept in the barrel portion 46b. The arm portions 42 are depressed by the head portion 13a and flexed in the direction toward the lens base 11. According to flexing of the arm portions 42, the edge segment 41b becomes engaged with the detent portion 34a and supported. The positioning ridge portion 47 is caused to press the first lens element 12 toward the receiving surface 31 of the lens base 11.

Figure 2B:
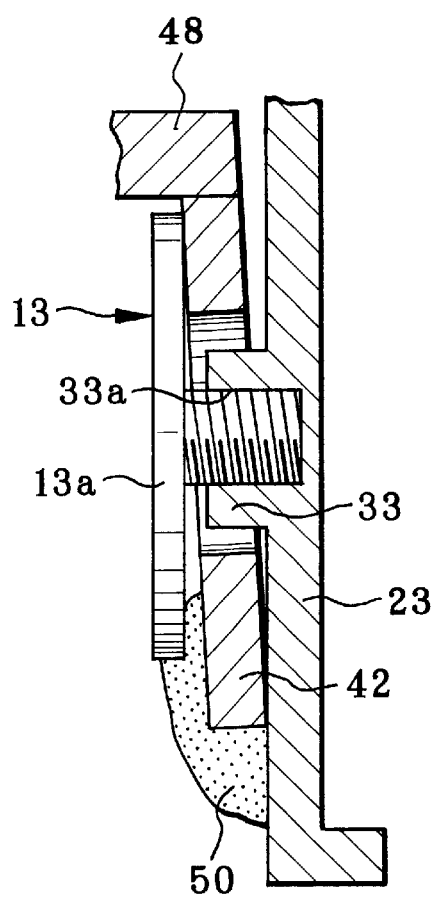
FIG. 2B is a cross section partially broken, illustrating a relationship between a retention screw, a front shutter cover and arm portions in the lens holding frame.

Walls of the lens holding frame 10 and the lens base 11 opposed to one another have a clearance or play between those. This causes the lens holding frame 10 to be shiftable vertically to the optical axis and also shiftable in parallel with the optical axis in a small range of the thickness of the clearance. Therefore, it is possible after assembling the lens holding frame 10 and the lens base 11 to the lens barrel to shift the lens holding frame 10 vertically to the optical axis to a minute extent for the purpose of fine adjustment to eliminate eccentricity. After the fine adjustment, adhesive agent 50 is applied to portions of the surface to be connected. See FIG. 2B. The lens holding frame 10 is thus fastened to the lens base 11.

The operation of the above construction is described now. In a line for manufacturing the lens barrel, the front and rear shutter covers 23 and 24 for accommodating the shutter blade 21 are fastened to one another by screws. The second lens element 22 is set in the lens holding chamber 24a of the rear shutter cover 24. The support plate 25, the solenoid 26 and other elements are fastened to the rear surface of the rear shutter cover 24.

The first lens element 12 is set in the barrel portion 46b of the lens holding frame 10. The lens holding frame 10 is inclined with reference to the lens base 11 at the shutter unit. The detent 34 is inserted in the engagement hole 41a. After this, the lens holding frame 10 is rearranged and becomes substantially parallel with the lens base 11, so as to engage the edge segment 41b with the detent 34. Also, the bosses 33 are inserted in the arm portions 42. The positioning projections 32 are inserted in the positioning holes 43a. The retention screws 13 are helically engaged in the screw receiving holes 33a of the bosses 33.

The arc-shaped slits 49 are formed along a line between the barrel portion 46b and the flange 48. When the retention screws 13 are fastened firmly, the arm portions 42 are pressed by the head portion 13a of the retention screws 13, and are flexed. Also, the edge segment 41b becomes engaged with the detent portion 34a and supported in connection. Due to the resiliency of the arm portions 42, the positioning ridge portion 47 is caused to press the first lens element 12 against the receiving surface 31. Note that clearance is kept intentionally between the lens base 11 and the lens holding frame 10 for a arrangement shiftable two-dimensionally in directions vertical to the optical axis.

The lens holding frame 10 and the lens base 11 manufactured in the above process are assembled in the lens barrel as a zoom lens. After this, the lens barrel is incorporated in the camera body. The lens barrel is moved for zooming. In order to set the definition higher than a reference level, the lens holding frame 10 is shifted two-dimensionally in directions vertical to the optical axis, to effect fine adjustment without eccentricity. After the fine adjustment, the adhesive agent 50 of a liquid state is applied to the projection portion 41, the arm portions 42 and the positioning arm portion 43, firmly to attach the lens holding frame 10 to the lens base 11. In conclusion, the size of the camera is reduced because the number of parts for holding the lens can be small. Also, the manufacturing cost can be reduced. The lens can be mounted easily and reliably. The taking lens can be positioned in the optical axis direction and also in directions vertical to the optical axis direction.

In the above embodiment, the lens holding frame 10 is coupled with the lens base 11 in the shutter unit. However, the lens base 11 for supporting the lens holding frame 10 according to the invention may be a portion of an element other than the shutter unit. In the above embodiment, the lens holding frame has the arm portions 42 with the retention screws 13 and the projection portion 41 fastened without the retention screws 13. Alternatively, a lens holding frame may have three engagement projections 41 for fastening without the arm portions 42 or the retention screws 13. This is effective in decreasing the number of parts.

In the above embodiment, the arm holes 41a and 42a are through holes. Alternatively, any of the projection portion 41 and the arm portions 42 may have a channel, recess, C-shaped notch or gap or edge in any shape suitable to be retained.

In the above embodiment, the camera is a photographic camera. However, a camera according to the invention may be a digital still camera, instant camera and other types. Also, a lens holding frame of the invention may be used in a video camera, projector, photographic printer and other optical instruments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens holding frame for securing at least one lens element to a lens base, comprising:

a holding frame body for sandwiching said lens element in cooperation with said lens base;

at least two arm portions, formed integrally with said holding frame body, having resiliency, for extending substantially radially from said holding frame body; and a retention member for retaining said arm portions to said lens base, said retention member being secured to said holding frame body with said arm portions kept resiliently deformed toward said lens base.

2. A lens holding frame as defined in claim 1, wherein said holding frame body includes:

a plate portion disposed over one surface of said lens element;

a lens opening, formed in a middle of said plate portion, for passage of light through said lens element; and a barrel portion disposed about a periphery of said lens element.

3. A lens holding frame as defined in claim 2, wherein said arm portions have respectively arm holes, and said retention member is screws inserted through said arm holes, and helically fastened on said lens base.

4. A lens holding frame as defined in claim 3, wherein said holding frame body further includes:

a flange formed on a periphery of said barrel portion, having said arm portions protruded therefrom;

plural arc-shaped slits formed between said barrel portion and said flange, positioned to correspond to said arm portions, for facilitating deformation of said arm portions with resiliency.

5. A lens holding frame as defined in claim 4, wherein said lens base is constituted by a plate of a shutter unit, and a recess is formed in said plate, for receiving entry of a portion of said lens element.

6. A lens holding frame as defined in claim 4, wherein bosses are formed on said lens base, for being inserted in said arm holes, and screw holes are formed in a middle of said bosses for helical engagement of said screws.

7. A lens holding frame as defined in claim 6, wherein said arm holes have a diameter greater than a diameter of said boss for adjustment of a position of said holding frame body relative to said lens base.

8. A lens holding frame as defined in claim 7, wherein said arm portions are attached to said lens base with adhesive agent after said screws are fastened on said bosses.

9. A lens holding frame as defined in claim 4, wherein said plate portion includes a projection, disposed in a circular shape, for contacting said surface of said lens element, to push said lens element to said lens base.

10. A lens holding frame as defined in claim 9, further comprising:
- a projection formed to project from said flange substantially radially;
- an engagement hole formed in said projection;
- a detent, formed with said lens base, for engagement with said engagement hole;
- at least one positioning pin disposed to project from said lens base;
- a positioning arm portion disposed to project from said flange; and
- at least one positioning hole, formed in said positioning arm portion, for being fitted on said positioning pin.

* * * * *